Oct. 28, 1958 E. J. O'BRIEN 2,857,965

RESET MECHANISM FOR TIME LOCKS

Filed Aug. 13, 1954 3 Sheets-Sheet 1

INVENTOR.
EARL J. O'BRIEN
BY
Peter P. Price
ATTORNEY

Oct. 28, 1958 E. J. O'BRIEN 2,857,965

RESET MECHANISM FOR TIME LOCKS

Filed Aug. 13, 1954 3 Sheets-Sheet 2

INVENTOR.
EARL J. O'BRIEN
BY Peter P. Price
ATTORNEY

Oct. 28, 1958 E. J. O'BRIEN 2,857,965

RESET MECHANISM FOR TIME LOCKS

Filed Aug. 13, 1954 3 Sheets-Sheet 3

INVENTOR.
EARL J. O'BRIEN
BY Peter P. Price
ATTORNEY

United States Patent Office 2,857,965
Patented Oct. 28, 1958

2,857,965

RESET MECHANISM FOR TIME LOCKS

Earl J. O'Brien, Grand Rapids, Mich.

Application August 13, 1954, Serial No. 449,746
6 Claims. (Cl. 161—15)

This invention relates to time clocks for vault locks such as are used in banks and more particularly to a means of releasing the clock in the event it is inadvertently overwound.

The standard bank vault is equipped with a door having a locking means. This locking means is regulated by a spring driven time clock. Prior to locking the vault, the number of hours it is desired to keep the vault locked before it can be opened is determined and the time clocks are wound accordingly. The locks release when the time clocks run down and stop because of failure of spring pressure. Thus, the length of time the vault will remain locked depends solely upon the extent to which the clock is wound. These clocks are equipped with a dial which indicates the number of hours the clock will run. This indicating dial rotates to give a continuous reading as the clock is wound.

It sometimes happens that the person winding the clock inadvertently overwinds it. When this happens with the conventional vault locking clock, the bank has but two choices. These are, to leave the vault open and post guards throughout the period the vault would normally be locked, or to lock the vault knowing that it will not open until several hours after it should normally be opened. With vault locking combinations of other designs, the door could be locked but the timing mechanism would be inoperative and thus the vault would be without this protection.

This invention is designed to provide a means for releasing the tension on the clock spring and returning the timing mechanism to zero should it be overwound. The invention includes means which make this release of the timing mechanism practically impossible except to one or two individuals who are instructed in the manner in which the mechanism may be released. This is to prevent unauthorized personnel from secretly releasing the mechanism just before closing and thus without the bank's knowledge permitting the vault to be opened at some earlier hour when its contents could be removed.

My invention is designed to permit the incorporation of this releasing mechanism upon a standard bank vault clock structure. Thus, it can be incorporated in existing bank vault equipment without requiring the replacement of the costly timing mechanism.

These and other objects and purposes of my invention will be readily understood by those acquainted with vault locking and timing mechanisms upon reading the following specification and the accompanying drawings.

In executing the objects and purposes of my invention, I have utilized a conventional timing mechanism for a bank vault lock. To this timing mechanism I have added means, which when pressed toward the main spring, causes release of the ratchet assembly holding the spring in tension, whereby the spring may be allowed to return to its normal or released position. The operator normally controls the unwinding of the spring by permitting the key to turn slowly in his hand. To effect this movement of the plate to release the spring holding ratchets, I have provided a dial mechanism which makes it substantially impossible for any person to operate the release unless that person is well acquainted with the combination of the dial. In the absence of properly operating the dial, the release mechanism cannot be effectively operated.

I. GENERAL DESCRIPTION

A. *The clock mechanism*

Figures 1, 2, 5, 6:
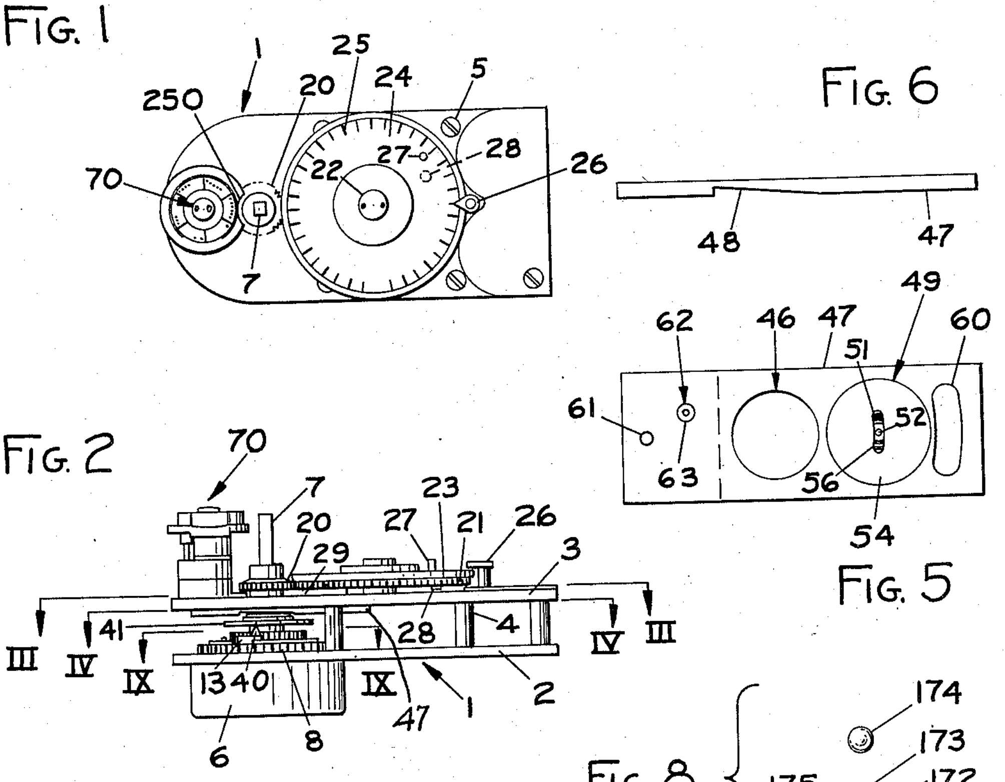
Fig. 1 is a plan view of a vault time clock equipped with my invention.
Fig. 2 is a side elevation view of the mechanism shown in Fig. 1 omitting the conventional clock gear train.
Fig. 5 is an enlarged plan view of the plate used to effect the release of the spring tension.
Fig. 6 is a side elevation view of the plate shown in Fig. 5.
Figure 4:
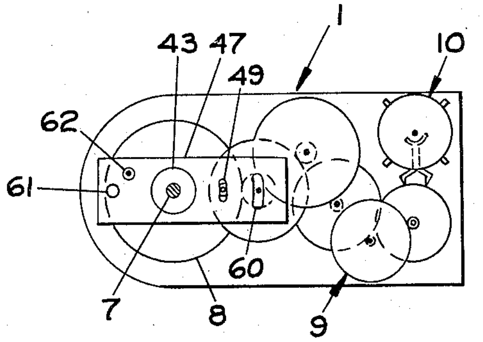
Fig. 4 is a sectional view taken along the plane IV—IV of Fig. 2 showing the clock gear train schematically.
Figure 9:
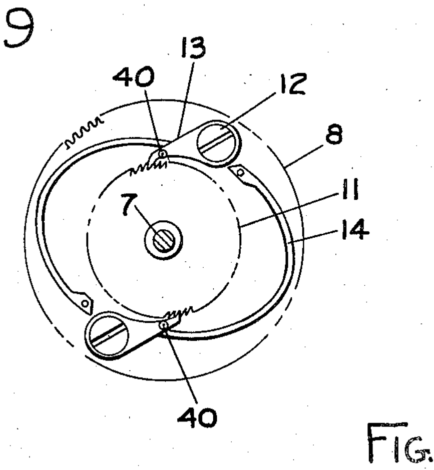
Fig. 9 is an enlarged sectional view taken along the plane IX—IX of Fig. 2.

Referring specifically to the drawings and more particularly to Figs. 1, 2 and 4, the numeral 1 indicates a clock mechanism, having a conventional frame consisting of a pair of spaced plates 2 and 3 separated by spacer posts 4 and held rigidly together by screws 5. Projecting below the bottom plate 2 is a spring housing 6 containing the main coil spring which provides the operating energy for operating the mechanism. The coil spring is mounted on a main stem 7 and by means of this stem operates a main gear 8 (Figs. 2 and 9). Release of the energy of the spring is controlled by a gear chain 9 (indicated diagrammatically in Fig. 4) with the rate of release controlled by a conventional escapement mechanism 10. Further discussion of the details of the gear train and escapement mechanism is not believed necessary since this is conventional structure and forms no part of this invention.

Seated on the top surface of the main gear 8 is a ratchet wheel 11 (Figs. 2 and 9). The ratchet wheel 11 is fixedly secured to the stem 7 and is rotated by the main spring as it unwinds. Pivotally mounted to the main wheel 8 by means of the screws 12 are a pair of pawls 13. The pawls 13 are biased into engagement with the teeth of the ratchet wheel 11 by means of springs 14.

The upper portion of the stem 7 is of square cross-section and on top of the upper plate 3 mounts a gear 20 (Figs. 1 and 2). The gear 20 meshes with a gear 21. The gear 21 is rotatably mounted to the plate 3 by a screw 22 (Fig. 1). Mounted to the top of the gear 21 is a cup-shaped plate 23 within which is mounted a disc 24 having impressed thereon indicia 25 indicating the number of hours the clock will run after a given amount of winding. The indicia 25 cooperate with an indicator 26.

Figure 3:
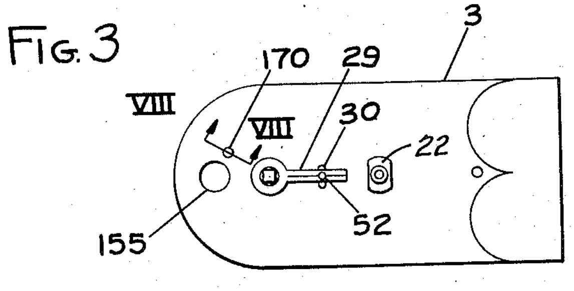
Fig. 3 is a plan view looking downwardly in the direction of the plane III—III of Fig. 2.

Projecting upwardly from the top of the dial 24 is a pin 27. This pin forms no part of this invention but serves as the means for transmitting information from the clock to the lock mechanism and causing the lock mechanism to release when the clock stops. Extending below the gear 21 is a second pin 28. This pin cooperates with the lever 29 (Figs. 2 and 3). The lever 29 is mounted for free pivotal movement about the stem 7. A slot 30 is provided in the upper plate 3 of the clock frame and in the normal mechanism a pin extends through the lever 29 and the slot 30 to limit the pivotal movement of the lever 29. The purpose of the lever 29 in the standard mechanism is to provide a stop for the gear 21 causing the indicia 25 to register zero when the clock unlocks and to register the maximum number of hours for which it is designed when the spring is fully wound. Since this structure is modified to some extent by this invention, further description of it will be provided hereinafter.

B. *Release mechanism for main spring*

Figure 10:
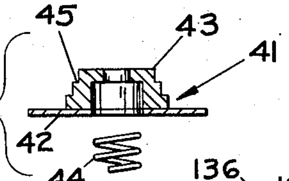
Fig. 10 is an enlarged exploded sectional view of the spring releasing hub of my invention.

In order to effect release of the main spring by means of this invention, a pair of generally cone-shaped knobs 40 are mounted one on each of the pawls 13 (Figs. 2 and 9). The knobs 40 cooperate with a spreader 41 (Fig. 2) having a circular lower plate 42 and an internally apertured hub 43 (Fig. 10). Within the hub 43 is a tension spring 44, one end of which rests against the inner shoulder of the centrally apertured hub 43 and the other end bears against the ratchet 11. The spring 44 normally biases the spreader 41 upwardly and away from the knobs 40.

The external surface of the hub 43 is formed into a series of steps 45. The top step 45 of the hub 43 passes through an opening 46 (Fig. 5) in the release plate 47. The size of the opening 46 is such that only the first step will pass through it, causing the release plate to seat against the top shoulder of the hub. The under surface of the release plate has a wedge shaped notch 48 which permits the plate to seat squarely down against the hub 43 when its outer end is pushed downwardly to force the spreader between the knobs 40 and release the main spring.

Figure 7:
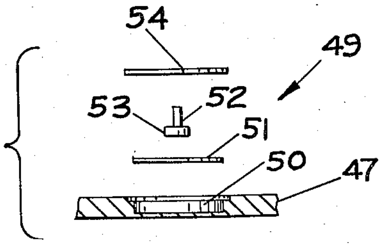
Fig. 7 is an enlarged fragmentary exploded view of the holding spring mounted within the plate shown in Fig. 5.

The release plate is so mounted that it is free to rotate about the hub 43. The pivotal movement of the release plate 47 about the hub 43 is limited by the restraining assembly 49 (Figs. 5 and 7). The restraining assembly consists of a large, blind opening 50 in the release plate 47. Seated in the opening 50 is a coil, hair spring 51 into the center of which is pressed the enlarged end 53 of the pin 52. The spring and the enlarged end 53 of the pin 52 are enclosed within the release plate 47 by the cover 54 which press-fits into the enlarged upper portion of the opening 50. The cover plate 54 is equipped with an elongated arcuate slot 56 permitting the pin 52 a limited amount of lateral travel with respect to the release plate 47. The pin 52 projects up through a slot in the upper plate 3 of the clock frame similar to the slot 51 and its top end is seated in a circular opening in the lever 29 (Fig. 3).

The outside diameter of the hair spring 51 is such that it bears against the side walls of the opening 50. This assures positive resistance to lateral displacement of the pin 52. The strength of the spring 51 is such that it will positively cause the plate to center about the pin 52 whenever the plate is free to do so but will not generate sufficient side thrust to cause damage to the pin 52 or to other parts of the mechanism even though they are of very small diameter and therefore low in shear strength. Thus, the pin 52 is free to float but as it floats it lightly urges the plate 47 to follow.

The release plate 47 is provided with a second arcuate slot 60. The arcuate slot 60 serves the purpose of permitting one of the shafts of the gear train 9 to pass through the release plate 47 without interference (Fig. 4).

Adjacent the end of the release plate 47 remote from the slot 60 is a pair of plunger openings. The first of the plunger openings 61 cooperates with the central pin of the dial mechanism 70. The second plunger opening 62 has a jewel bushing 63 and cooperates with a locking pin or plunger 172 (Fig. 8) for the release plate 47. The purpose of these openings will be explained in detail hereinafter.

C. *The dial assembly*

Figure 11:
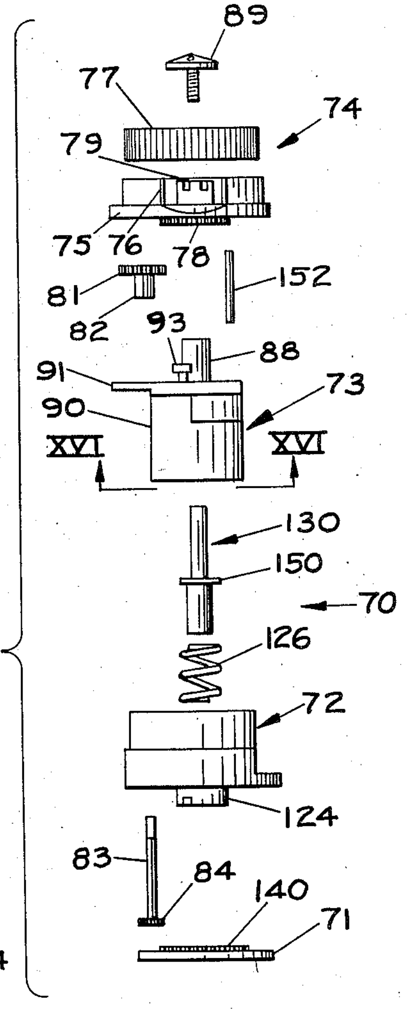
Fig. 11 is an enlarged exploded view of the dial release mechanism of my invention.

The dial assembly 70 is best illustrated in the exploded view, Fig. 11. The dial assembly 70 consists basically of an actuator plate 71, a lower casing component 72, an upper casing component 73 and a top assembly 74.

The top assembly 74 consists of a generally cup-shaped dial housing 75 having a side opening 76. The upper portion of the dial housing 75 is annular, creating a chamber for seating the disc 77. The disc 77 on its upper face is provided with suitable indicia to inform the operator which portion of the disc is oriented toward the opening 76. The edge of the disc 77 is serrated to facilitate its rotation by the operator.

Rotatably and concentrically mounted to the bottom of the dial housing 75 is a gear 78. The hub portion of the gear forms a partially segmented, annular stem 79. The disc 77 has radially inwardly projecting fingers 80 (Fig. 22) which engage the slots formed in the stem 79 and thus transmit the rotary motion of the disc 77 to the gear 78.

The gear 78 meshes with the gear 81 which has a long, downwardly projecting hub 82. The hub has a central, square aperture for receiving the square shank portion of the upper end of the shaft 83 mounting the gear 84.

The upper casing component 73 has an upwardly extending annular stem 88. The stem 88 is internally threaded to receive the screw 89 (Figs. 11 and 17). The stem 88 projects through the gear 78 to serve as the axis about which the disc and the gear rotate. The upper casing component 73 has an annular depending apron 90 (Figs. 11, 16 and 17), vertically divided from the stem portion 88 by a generally circular, radially extending flange portion 91. The flange portion 91 has an eccentric opening 92 (Fig. 16) to receive the hub 82 of the gear 81. Projecting upwardly from the flange portion 91 are a pair of headed pins 93 (Figs. 11 and 17) which engage the semi-circular slots 94 (Figs. 23 and 24) in the bottom of the dial housing 75. Each of the slots 94 is enlarged at one end to permit entry of the heads of the pins 93. After insertion of the pins 93, rotation of the dial housing 75 locks the dial housing to the upper casing component 73, the heads of the pins being thereby engaged in the channels 95 within the dial housing 75 (Fig. 23).

Figures 16, 17, 18, 19, 20, 21, 22, 23, 24, 25, 26, 27, 28, 29, 32:
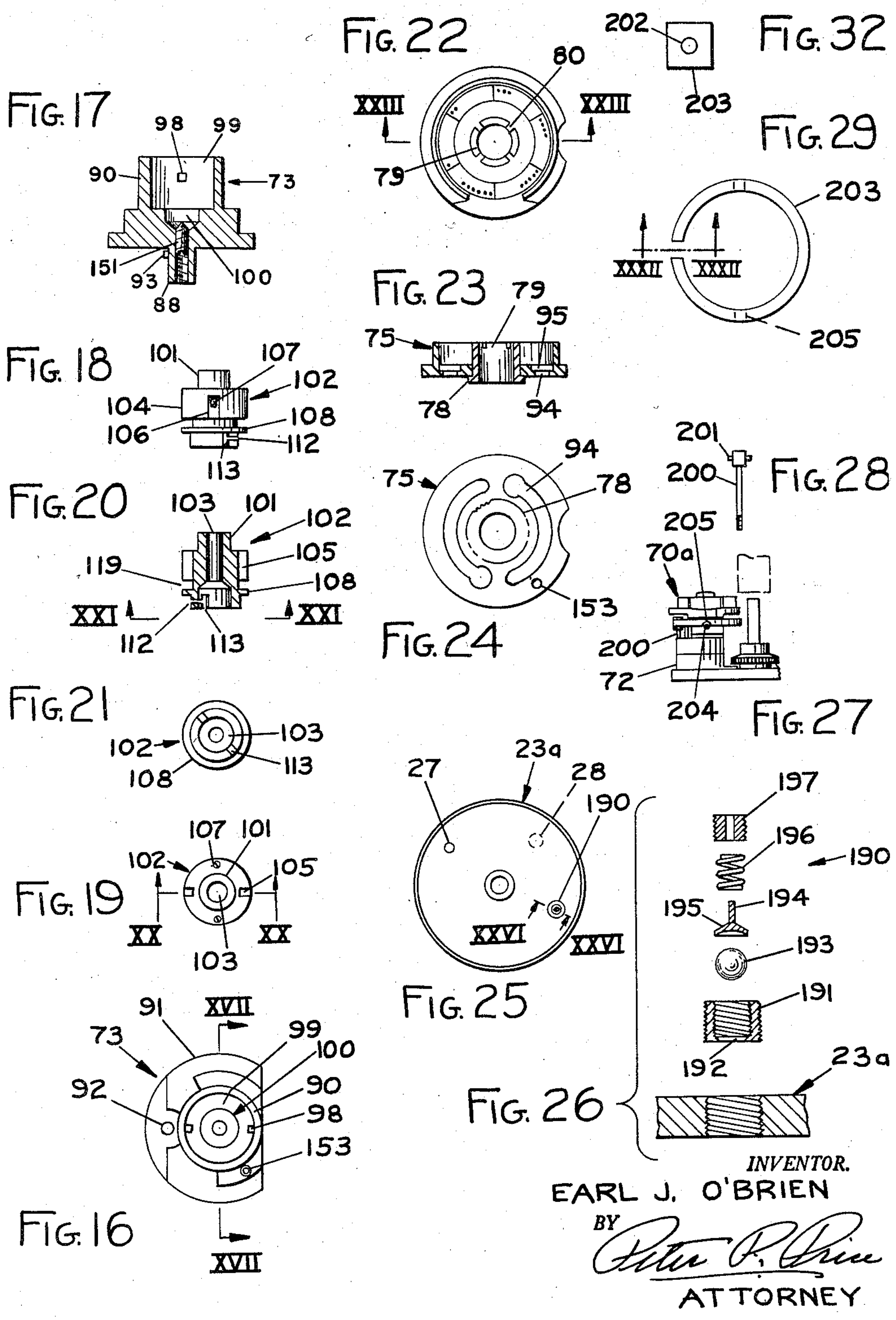
Fig. 16 is a bottom view of the upper casing component of my dial release mechanism taken along the plane XVI—XVI of Fig. 11.
Fig. 17 is a sectional view taken along the plane XVII—XVII of Fig. 16.
Fig. 18 is a side elevation view of the inner connecting component of the dial release mechanism shown in Fig. 11.
Fig. 19 is a plan view of the inner connecting component shown in Fig. 18.
Fig. 20 is a sectional view taken along the plane XX—XX of Fig. 19.
Fig. 21 is a bottom view taken along the plane XXI—XXI of Fig. 20.
Fig. 22 is an enlarged plan view of the dial component for my lock release mechanism with the mounting screw omitted.
Fig. 23 is a sectional elevation view taken along the plane XXIII—XXIII of Fig. 22.
Fig. 24 is a bottom view of the dial component of the dial mechanism of my lock release mechanism.
Fig. 25 is a plan view of a modified time indicia dial for the clock mechanism with the indicia bearing plate omitted.
Fig. 26 is an enlarged exploded fragmentary sectional view taken along the plane XXVI—XXVI of Fig. 25.
Fig. 27 is a fragmentary side elevation view of a modified design for the dial release mechanism of my invention.
Fig. 28 is a side elevation view of a post used in the modified design appearing in Fig. 27.
Fig. 29 is a plan view of a ring used in the modified design shown in Fig. 27.
Fig. 32 is a view of one of the ends of the split ring shown in Fig. 29. This view was taken in a direction indicated by the arrows XXXII—XXXII of Fig. 29.

The annular apron 90 has a pair of short diametrically spaced fingers 98 projecting into the chamber 99 (Figs. 16 and 17). The purpose of these fingers will be explained more fully hereinafter.

The chamber 99 has a concentric recess 100 at its upper end. This recess receives the reduced, upper end 101 of the locking member 102 (Figs. 18 through 21). The locking member has a central bore 103 extending vertically through it. The lower portion of the bore 103 is of greater diameter than the upper portion. The locking member 102 has a radially extending shoulder 104 provided with a pair of diametrically positioned vertical slots 105. The slots 105 are equally spaced from another pair of diametrically positioned slots 106 blind on their upper ends. Each of the slots 106 has an adjustment screw 107 projecting into its upper end to limit the depth of penetration of any member entering the slots. The slots 105 are designed to cooperate with the fingers 98 within the chamber 99. Below and spaced from the shoulder 104 is a radially projecting flange 108 serving as a stop for the fingers 98. Below the flange 108 is a pair of circumferentially extending diametrically positioned slots 112 to each of which access is had by means of a vertical slot 113. The slots 112 and 113 penetrate entirely through the wall surrounding the lower portion of the centric bore 103.

Figure 15:
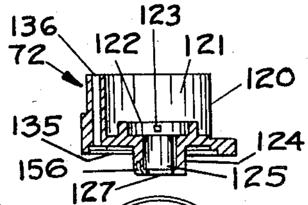
Fig. 15 is a central sectional view taken along the plane XV—XV of Fig. 14.
Figure 14:
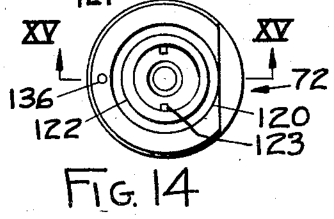
Fig. 14 is a plan view of the lower casing component of the dial release mechanism shown in Fig. 11.

The upwardly projecting apron 120 of the lower casing component 72 defines a chamber 121 within the center of which is a short, upwardly extending annular ridge 122 (Figs. 14 and 15). The ridge 122 is spaced sufficiently from the apron 120 to permit the bottom of the apron 90 of the upper casing component 73 to seat therebetween. The internal diameter of the ridge 122 is such that the lower portion of the locking member 102 will seat therein. The ridge 122 has a pair of diametrically positioned, short, radially inwardly extending fingers 123. The fingers 123 are designed to pass into and engage the slots 112 and 113 (Figs. 18 and 20) of the locking member 102.

The lower casing component 72 has a downwardly projecting annular hub 124 having, in its upper portion, an enlarged chamber 125 (Fig. 15) for seating the spring 126 (Fig. 11). The bottom of the chamber 125 is apertured at 127 to permit the passage therethrough of the lower end of the central pin 130 (Fig. 11).

Figure 30:
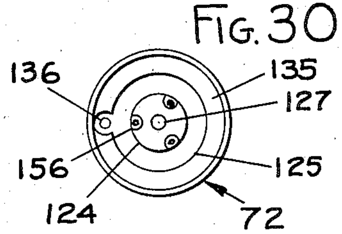
Fig. 30 is a bottom view of the lower casing component of the dial assembly.

The bottom face of the lower casing component 72 is recessed at 135 to receive the actuator plate 71 (Fig. 30). The recess 135 communicates with an eccentric chamber 136 through which extends the stem 83 of the gear 84.

Figure 12:
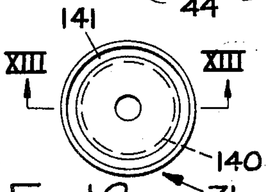
Fig. 12 is a bottom view of the lower gear of the dial mechanism shown in Fig. 11.
Figure 13:
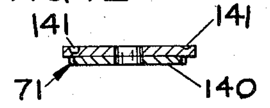
Fig. 13 is a sectional elevation view taken along the plane XIII—XIII of Fig. 12.

The actuator plate 71 has a gear 140 on its upper face meshing with the gear 84 on the stem 83. The lower face of the actuator gear, adjacent its periphery, has a circumferentially extending channel 141 of arcuate cross-section (Figs. 12 and 13). The channel 141 is of varying depth along its length, having a maximum depth at only one point.

Projecting up through the dial assembly is the central pin 130. The central pin 130 has an intermediate radially extending flange 150 for engaging the upper end of the spring 126. The spring 126 seats about the lower end of the plunger 130. The upper end of the plunger 130 is engaged by the end of the vertical adjustment screw 151 (Fig. 17) which is threaded into the bottom of the central opening in the stem 88 of the upper casing component 73.

The entire assembly is locked against rotation by the pin 152 (Fig. 11) which passes through aligned openings 153 in the dial housing 75 (Fig. 24), the upper casing component 73 (Fig. 16) and the lower casing component 72. The upper portion of the opening in the dial housing 75 is enlarged to permit the pin to be grasped for removal when it is desired to disassemble the dial assembly.

Figure 31:
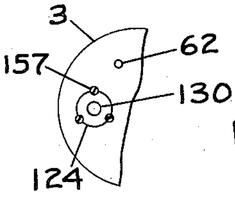
Fig. 31 is a fragmentary bottom view of the top frame plate for the timing gear chain showing the means for mounting the dial release mechanism.

The hub 124 of the lower casing component 72 projects through the actuator plate 71 and the aperture 155 (Fig. 3) in the upper plate 3 of the clock assembly. The bottom of the hub 124 has three counter-sunk, threaded openings 156, a portion of the countersinks extend beyond the edge of the hub 124 for reception of the mounting screws 157 (Figs. 15 and 31). The heads of the mounting screws 157 engage segmental countersunk openings in the plate 3, holding the dial assembly securely to the plate.

Figure 8:
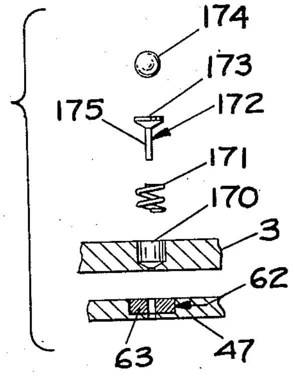
Fig. 8 is an enlarged fragmentary exploded sectional view taken along the plane VIII—VIII of Fig. 3.

Adjacent the opening 155, the plate 3 has a second opening 170 (Figs. 3 and 8). The opening 170, at its lower end, tapers to a narrow opening extending through the bottom of the plate. Seated in the opening 170 are a spring 171, a plunger 172 having a stem 175 and an enlarged, somewhat cup-shaped head 173 for seating the ball 174. Under the urging of the spring 171 the plunger forces the ball 174 upwardly into the channel 141 of the actuator plate 71. The stem 175 of the plunger 173 projects through the plate 3 and when the release plate 47 is in one particular position extends through the opening 62.

The aperture 61 in the release plate 47 is designed to pass the plunger 130. This opening 61 is aligned with the plunger 130 at all times when the stem 175 is in the opening 62.

II. MODIFICATIONS

In Fig. 25 there is shown a modified design for the gear 21. The gear 23*a* is the same as the gear 21 except that it is equipped with a plunger assembly 190 (Figs. 25 and 26). The plunger assembly 190 consists of an internally and externally threaded bushing 191 having a restricted opening 192 at one end. By means of the external threading, the bushing 191 is mounted in the gear 23*a*. Seated within the threaded bushing 191 is a ball 193 engaged by a plunger 194 having a somewhat cup-shaped head 195 on its lower end to seat about the ball and a spring 196 acting against the plunger 195 when the parts are assembled within the bushing 191 and the centrally apertured pressure nut 197 is installed. When the assembly is complete, the pressure nut causes the spring 196 to urge the ball tightly into the restricted opening 192 where it will project below the surface of the gear 23*a*. The projecting portion of the ball 193, as the gear 23*a* rotates, contacts the lever 29 moving it to one side. The ball is designed to produce sufficient resistance to move the lever 29 but insufficient force, before releasing the lever, to cause breakage of the thin pin 52 projecting into it from the release plate 47.

Figs. 27, 28, 29 and 32 show a dial assembly 70*a* which is a modified design of the dial assembly 70 of Figs. 1, 2 and 11. In this design, a stem 200 is provided on the side of the dial assembly 70*a*. The bottom of the pin 200 is threadedly mounted into an appropriate opening on one side of the lower casing component 72. The upper end of the pin is headed and has a pair of outwardly projecting and oppositely disposed pins 201 (Fig. 28). Each of these pins seat in one of the openings 202 in the ends of the split ring 203. Thus, the stem 200 supports the ring 203 with the pins 201 serving as a pivot for vertical movement of the ring. A pair of diametrically positioned and radially, outwardly extending screws 204 are provided on the upper casing component 73. The notches 205 in the ring 203 seat the screws 204. When the ring is pivoted downwardly about the pins 201 the walls of the notches 205 engage the screws 204 urging the entire dial assembly downwardly with the ring. Thus, the ring 203 serves as a pivoted lever. The purpose of this will appear more fully hereinafter.

III. ASSEMBLY

In order to assemble my invention to an existing timing or clock structure, such as would be contained in the housing 1, the top plate 3 is removed and the necessary openings 155 and 170 made therein. The pawl spreader member 41 is then placed on the stem 7 together with the release plate 47.

Before reassembly of the plate 3, the dial assembly 70 is mounted to the plate by means of the screws 157.

Assembly of the dial assembly 70 is described in the following paragraphs.

Before assembly of the locking member 102 to the lower casing component 72, the plunger 130 is placed within the locking member 102. The spring 126 is then seated about the lower end of the plunger.

The locking member 102 is telescoped into the chamber 121 of the lower casing component 72. The locking member is then turned so that the slots 113 are aligned with the fingers 123. With these so aligned, the locking member 102 is pressed within the ridge 122 until, by rotation of the locking member, the fingers 123 prevent further rotation by abutting the ends of the slots 112. This secures the locking member 102 to the lower casing component 72.

The pressure of the spring 126 bearing against the flange 150 of the plunger 130 and the plunger in turn pressing upwardly against the locking member 102 tends to hold the locking member 102 securely in place.

The upper casing component 73 is then assembled by aligning the fingers 98 with the slots 105. The fingers 98 (Fig. 17) are passed down through the slots 105 until they enter the annular channel 119 between the shoulder 104 and the flange 108 (Fig. 20). By rotation of the upper casing component 73 through an arc of 90°, the fingers 98 are caused to align with the slots 106. Upon pulling the upper casing component 73 upwardly, the fingers will be cause to enter these slots and to abut against the stop screws 107. The screw 151 is then adjusted to provide the desired amount of relative vertical movement between the upper and lower casing components 72 and 73.

The next step is to assemble the gear 81 by dropping its hub 82 through the appropriate opening in the upper casing component 73. The assembly of the dial housing 75 to the rest of the dial assembly locks the gear 81 in place.

The gear 78 is assembled to the dial housing 75 before the dial housing is attached to the rest of the assembly. The dial housing 75 is assembled by passing it downwardly over the heads of the pins 93 and rotating it until the heads are securely engaged at the opposite ends of the channels 95.

Before insertion of the dial 77, the various parts including the dial housing 75 and the upper and lower casing components 73 and 72 are rotated to cause alignment of the various segments of the opening 153. This permits insertion of the pin 152, locking these components against rotation with respect to each other.

The disc 77 is then pressed onto the hub of the gear 78 and the screw 89 secured. The dial assembly is now securely held together.

The gear 84 is then assembled by passing its shaft 83 up through the opening 136 with the square shank portion entering the hub 82 of the gear 81. The length of the shaft 83 is such that it permits relative movement between the upper and lower casing components since this movement is absorbed by a telescoping action between the shaft 83 and the hub 82. With the gear 84 in place, the actuating plate 71 is seated within the bottom recess 135 of the lower casing component 72. The dial assembly is then ready for installation to the plate 3.

Where the dial assembly is of the modified type, the post 200 is assembled to the lower casing component 72 prior to the mounting of the upper casing component 73. The ring 203 is loosely placed about the upper casing component 73 prior to its assembly to the lower casing component 72 and the ring snapped onto the pins 201 after the rest of the assembly is complete. The screws 204 are then inserted to hold the ring in place.

OPERATION

It will be noted from inspection of Fig. 1 that the dial assembly 70 is provided with an arcuate cut-out 250 adjacent the stem 7. This permits the passage of a standard key without interference with the dial assembly. The key is inserted on the stem 7 and rotated, to the left as the assembly is illustrated in Fig. 1, to wind the main spring. As the winding progresses, the dial 24 rotates to the right to automatically register at the pointer 26 the number of hours the mechanism will run.

When the spring is entirely run down, the position of the gear 21 is such that the pin 28 presses the lever 29 to the right (or down as the lever 29 appears in Fig. 3). By means of the pin 52 and the hair spring 51, this causes the release plate 47 to pivot in the same direction. In this position the aperture 61 is aligned with the plunger 130 and the jeweled opening 62 is aligned with the stem 175 of the plunger 172. If the dial assembly 70 is turned to any position other than the one point at which it releases the plunger 172, the actuator plate 71 will force the plunger 172 into the jeweled opening 62. This locks the release plate in its cocked position even after winding of the main spring causes the pin 28 to leave the lever 29. The plunger 130 will be inoperative to tilt the release plate 47 since the aperture 61 is now aligned with it.

If, at this time, the dial assembly 70 is manipulated to release the plunger 172, the release plate will not move since during the normal winding of the main spring there is nothing to urge the lever 29 to a new position.

If the main spring is inadvertently overwound, the operator then continues winding until contact between the pin 28 and the lever 29 prevents further winding. In this operation the pin 28 forces the lever 29 to pivot to the left (or upwardly as the lever appears in Fig. 3). The release plate 47 is accordingly urged to follow but is restrained by the plunger 172.

The disc 77 is now turned and by means of the gears 78, 81, 84 and 140 the actuator plate 71 is rotated. When the deepest point of the channel 141 is aligned with the ball 174, the ball 174 and the plunger 172 will be urged upwardly by the spring 171 withdrawing the stem 175 from the jeweled opening 62. This immediately frees the release plate 47. Under the urging of the hair spring 51 the release plate will tend to center about the pin 52. This movement of the release plate will misalign the aperture 61 and the plunger 130. By pressing the dial assembly 70, and thus telescoping of the upper and lower casing components 73 and 72 respectively, the release plate 47 is pressed downwardly.

The downward movement of the release plate is immediately transmitted to the spreader 41. In turn, the downward movement of the spreader 41 causes the disc-like plate 42 on the spreader to pass between the conical knobs 40 on the pawls 13. Because of their conical shape, this movement will force the pawls outwardly disengaging the end of the pawls from the ratchet wheel 11. Upon release of the pawls, the key becomes the only means restraining the spring and the operator may release all the spring tension by permitting the key to turn slowly. By giving the disc 77 a slight turn, the stem 175 is again urged to enter the jeweled opening 62 which will be aligned with the stem since the return of the gear 21 to its original position will bring the pin 28 against the lever 29 pressing it to the right. This urges the release plate 47 to the position where the aperture 61 is aligned with the plunger 130 and the jeweled opening 62 is aligned with the stem 175.

To facilitate the operation of the release plate 47, it is desirable, and in some cases may be necessary, to turn the key slightly as though winding the spring. This releases the pressure on the pawls 13 and materially reduces the resistance to the downward movement of the spreader 41.

Where the dial assembly is modified to include the lever or ring 203, as in Fig. 27, the ring projects into the path of the key. Thus, after the dial has been properly set to release the ball 174, the release plate 47 may be tilted by pressing the key further onto the stem 7. The end of the key will engage the ring and pivot the ring downwardly. This causes the ring to bear against the screws 204, moving the dial assembly downwardly and the end of the plunger 130 to engage the release plate 47, resulting in the spreading of the pawls 13.

This arrangement has certain operating advantages. It permits the operator to effect release of the spring with only one hand. This is particularly advantageous in situations where there is only restricted access to the mechanism.

A more important advantage lies in protection of the mechanism itself. Should the key slip in the operator's hand after the pawls are released, the sudden unwinding of the main spring, if unchecked, could very well break the clock mechanism. Where the operator uses one hand to manipulate the key and one hand to manipulate the pawl release mechanism, the release mechanism will normally be held in released position. Should the key slip, the operator's reflexes would normally be too slow to release the release mechanism before the spring had unwound and caused damage. When, however, the operator is manipulating a key alone, the slippage of the key will permit it automatically to move outwardly under the urging of the springs 44 and 126. This immediately inactivates the release mechanism and the pawls 13 will engage to stop the spring.

It will be recognized that various modifications of my invention may be made, each without departing from the principle thereof. Each of these modifications is to be considered as included in the hereinafter appended claims, unless these claims by their language expressly state otherwise.

I claim:

1. In means for releasing the tension of the main spring of a vault lock timing mechanism, said main spring being wound about a stem and restrained by a ratchet toothed gear and a cooperating resiliently biased pawl, the combination comprising: a knob on said pawl, said knob having an inclined face; a spreader plate slidably seated about said stem, said spreader plate adapted to engage said inclined face of said knob for urging said pawl away from said gear; first means urging said spreader plate away from said knob; second means urging said spreader plate against said knob and said first means.

2. In means for releasing the tension of the main spring of a vault lock timing mechanism, said main spring being wound about a stem and restrained by a ratchet toothed gear and a cooperating resiliently biased pawl, the combination comprising: a knob on said pawl, said knob having an inclined face; a spreader plate slidably seated about said stem, said spreader plate adapted to engage said inclined face of said knob for urging said pawl away from said gear; means urging said spreader plate away from said knob; a release plate seated intermediate its ends against said spreader plate; said spreader plate mounted for reciprocal movement toward and away from said knob; means for urging said release plate against said spreader plate and said spreader plate against said knob for disengaging said pawl from said ratchet.

3. In means for releasing the tension of the main spring of a vault lock timing mechanism, said main spring being wound about a stem and restrained by a ratchet gear and a cooperating resiliently biased pawl, said timing mechanism having a frame including a stationary frame plate apertured for passage therethrough of said stem, the combination comprising: a knob on said pawl, said knob having an inclined face; a spreader plate slidably seated about said stem between said frame plate and said ratchet gear; a release plate seated about said stem between said frame plate and said spreader plate; said release plate intermediate its ends bearing against said spreader plate; said release plate being rockable axially of said stem about one of the ends of said release plate; resilient means urging said spreader plate and said release plate toward said frame plate; said release plate being pivotally movable about said stem in a direction normal to the axis of said stem; biasing means, when said main spring is fully released, urging said release plate pivotally in one direction; means engaging said release plate in its maximum position of travel in said one direction for locking said release plate against pivotal movement; an aperture in said release plate; a plunger adapted to pass through said aperture when said plate is locked; said biasing means adapted to urge said release plate in the opposite pivotal direction when said main spring is fully wound; means for releasing said locking means whereby said release plate may pivot in said opposite direction; said aperture in said release plate being misaligned with said plunger when said release plate is pivoted in said opposite direction whereby pressure on said plunger will rock said release plate about said one end thereof, urging said spreader plate against said knob and said pawl to disengage said ratchet.

4. In means for releasing the tension of the main spring of a vault lock timing mechanism, said main spring being wound about a stem and restrained by a ratchet gear and a cooperating resiliently biased pawl, said timing mechanism having a frame including a stationary frame plate apertured for passage therethrough of said stem, the combination comprising: a knob on said pawl, said knob having an inclined face; a spreader plate slidably seated about said stem between said frame plate and said ratchet gear; a release plate seated about said stem between said frame plate and said spreader plate; said release plate intermediate its ends bearing against said spreader plate; said release plate being rockable axially of said stem about one of the ends of said release plate; resilient means urging said spreader plate and said release plate toward said frame plate; said release plate being pivotally movable about said stem in a direction normal to the axis of said stem; biasing means, when said main spring is fully released, urging said release plate pivotally in one direction; axially slidable locking means engaging said release plate in its maximum position of travel in said one direction for restraining said release plate against pivotal movement; an aperture in said release plate; a plunger adapted to pass through said aperture when said plate is locked; said biasing means adapted to urge said release plate in the opposite pivotal direction when said main spring is fully wound; a combination lock having a rotatable bottom disc, said combination lock mounted to said frame plate; said rotatable bottom disc having an annular channel of varying depth; resilient means urging said locking means into said channel; said channel at one point having a depth such that said locking means will disengage said release plate whereby said release plate may pivot in said opposite direction; said aperture in said release plate being misaligned with said plunger when said release plate is pivoted in said opposite direction whereby pressure on said plunger will rock said release plate about said one end thereof, urging said spreader plate against said knob and said pawl to disengage said ratchet.

5. In means for releasing the tension of the main spring of a vault lock timing mechanism, said main spring being wound about a stem having a key engaging portion adapted to telescope into a key and restrained by a ratchet toothed gear and a cooperating resiliently biased pawl, the combination comprising: a knob on said pawl, said knob having an inclined face; a spreader plate slidably seated about said stem, said spreader plate adapted to engage said inclined face of said knob for urging said pawl away from said gear; first means urging said spreader plate away from said knob; second means adapted to be activated by a key mounted on said key engaging portion of said stem for urging said spreader plate against said knob and said first means.

6. In means for releasing the tension of the main spring of a vault lock timing mechanism, said main spring being wound about a stem having a key engaging portion adapted to telescope into a key and restrained by a ratchet toothed gear and a cooperating resiliently biased pawl, the combination comprising: a knob on said pawl, said knob having an inclined face; a spreader plate slidably seated about said stem, said spreader plate adapted to engage said inclined face of said knob for urging said pawl away from said gear; first means urging said spreader plate away from said knob; second means urging said spreader plate against said knob and said first means; a spring element biasing said second means to inoperative position.

References Cited in the file of this patent

UNITED STATES PATENTS

| | | |
|---|---|---|
| 173,537 | Hagen | Feb. 15, 1876 |
| 602,750 | Henderson et al. | Apr. 19, 1898 |
| 2,051,559 | Keeley | Aug. 18, 1936 |
| 2,285,328 | Clarkson | June 2, 1942 |
| 2,296,760 | Barry | Sept. 22, 1942 |
| 2,572,015 | Devanney | Oct. 23, 1951 |